Nov. 7, 1950 T. D. SHARP 2,529,425
SYSTEM OF FURNISHING AIR CONDITIONING, COMMUNICATION
AND ENTERTAINMENT TO PARKED VEHICLES
Filed Dec. 28, 1945 2 Sheets-Sheet 2
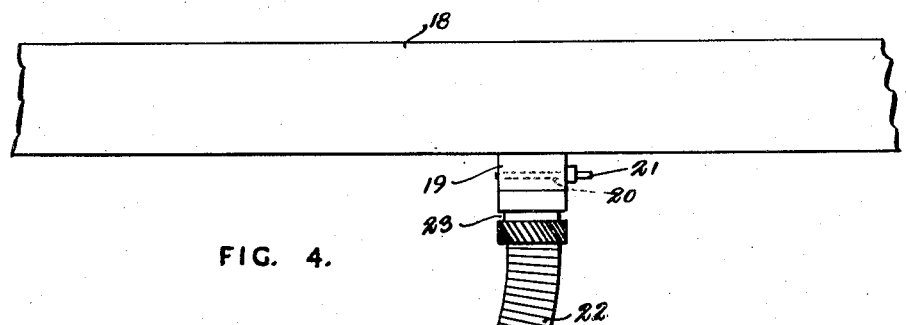
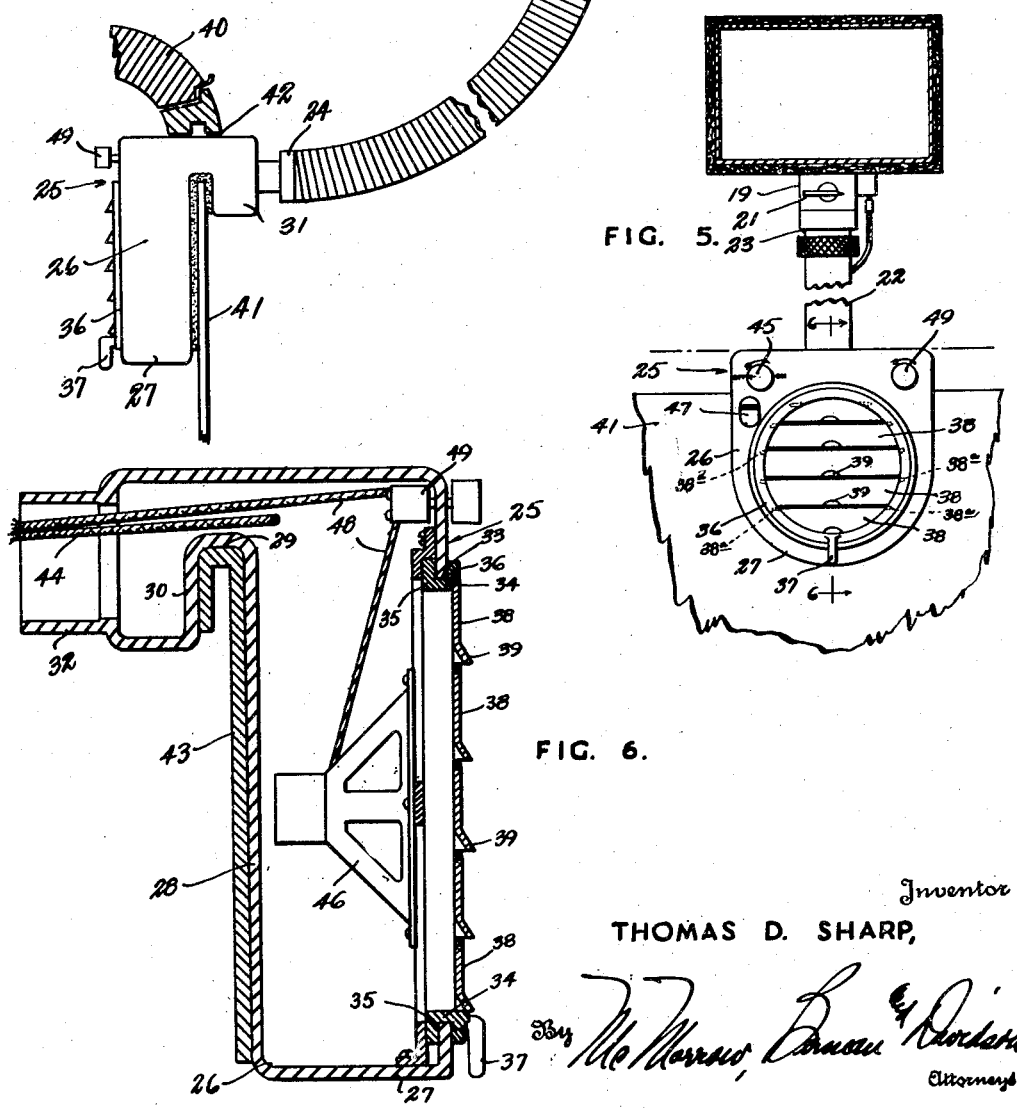
THOMAS D. SHARP, Inventor Patented Nov. 7, 1950

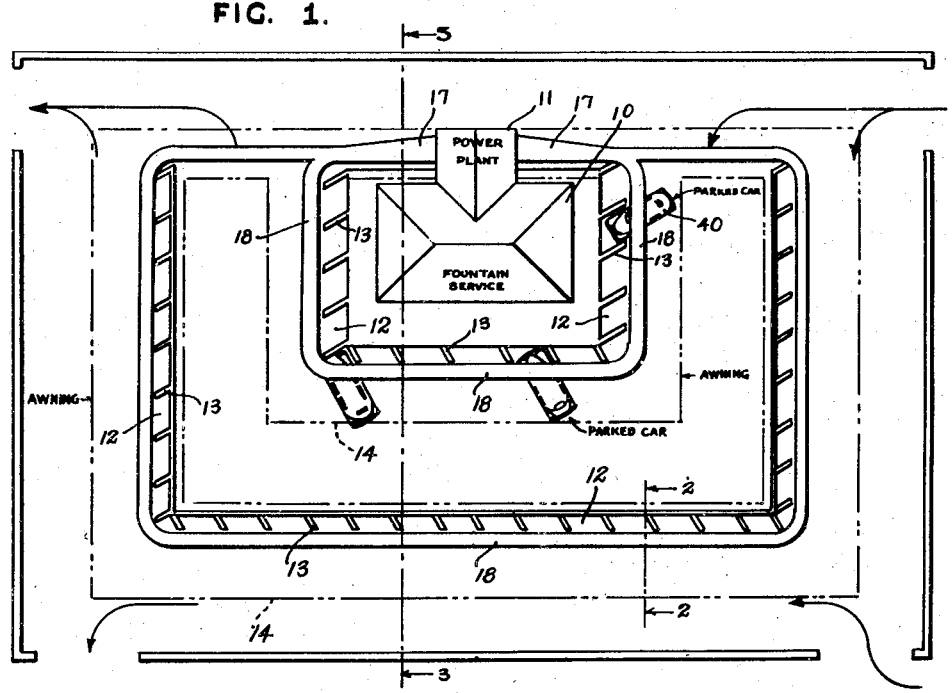
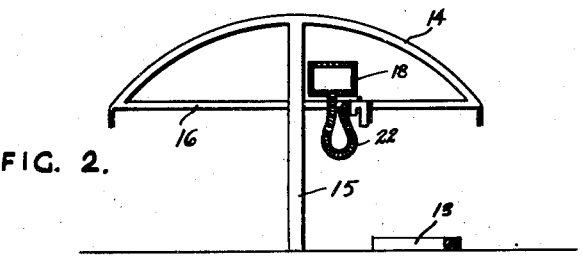
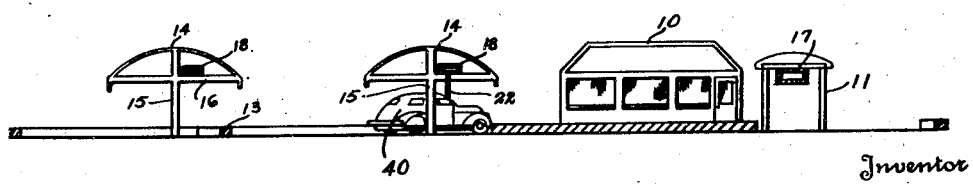

2,529,425

UNITED STATES PATENT OFFICE 2,529,425

SYSTEM OF FURNISHING AIR CONDITIONING, COMMUNICATION, AND ENTERTAINMENT TO PARKED VEHICLES

Thomas D. Sharp, New Orleans, La.

Application December 28, 1945, Serial No. 637,698

2 Claims. (Cl. 98—2)

The invention relates to a system of air conditioning parked vehicles, and at the same time providing communication and entertainment for their occupants.

An object of the invention is to air condition a vehicle that is parked in a parking lot, outdoor movie, roadside refreshment place or the like.

Another object of the invention is to make it possible for patrons of roadside stands and the like to remain comfortably seated in a parked air-conditioned vehicle and at the same time to communicate with an attendant to order refreshments.

A further object of the invention is to furnish entertainment to patrons of roadside stands and the like while they remain seated in their comfortably air conditioned vehicles.

Other objects of the invention will appear in the following specification describing the invention with reference to the drawings illustrating a preferred embodiment thereof. It is, however, to be understood that the invention is not to be limited or restricted to the exact construction and combination of elements and parts described in the specification and shown in the drawings, but that such changes and modifications may be made that fall within the scope of the claims appended hereto.

In the drawings:

Figure 1 is a plan view of a roadside refreshment stand equipped with the novel system of furnishing parked vehicles with air conditioning, communication and entertainment.

Figure 2 is a vertical sectional view taken on line 2—2 in Figure 1.

Figure 3 is a vertical sectional view taken on line 3—3 in Figure 1.

Figure 4 is an elevational detail view showing the air conditioning means connected to a window of a vehicle.

Figure 5 is a fragmentary end elevation of Figure 4, and

Figure 6 is a vertical sectional view taken on line 6—6 in Figure 5.

Relating to the drawings in detail, a roadside stand 10 has a power plant 11 attached to it. The power plant is equipped with the necessary means for air conditioning, but this means is not illustrated or shown, since it is generally known.

In Figure 1 the roadside stand is shown as being surrounded at its sides and its front by two rows of parking places 12, each parking place being divided from the adjacent one by means of parking rail guides 13. Awnings 14 are provided which extend above the parking places to protect parked cars or other vehicles from the heat of the sun, or from rain or snow. The awnings 14 are supported by center posts 15 and horizontal beams 16.

Air ducts 17 lead from the power plant 11, and from these ducts 17 a series of branch ducts 18 branch off and extend around both rows of parking places, said branch ducts being supported by the horizontal beams 16. Over each parking place 12 the branch duct 18 is provided with an outlet 19 having mounted therein an air regulating and shut off valve 20 equipped with a handle 21. To each outlet 19 a flexible hose 22 is removably attached by means of a coupling 23. At the free end of the flexible hose 22 is fastened a nipple 24 which connects said hose with a housing 25. This housing has a vertically extending main portion 26. The bottom 27 of this main portion is formed semi-cylindrical so that the front wall of this main portion has a lower semi-circular part. The rear wall 28 does not extend all the way to the top of the housing 25 but extends at right angles for a short distance rearwardly as shown at 29 in Figure 6. The wall turns then downwardly at 30 parallel to the rear wall 28 forming therewith and with the horizontal wall portion 29 a hook-shaped section 31. Then the wall extends rearwardly to form a cylindrical section 32 adapted to receive the nipple 24.

In the front wall of the main housing portion 26 a circular opening 33 is provided. A circular frame 34 is rotatably mounted therein having a circular flange 35 thereon abutting the inside of the front wall of the housing. The circular frame 34 extends through the opening 33, and a ring frame 36 is rigidly fastened thereon, for instance by welding, so that the circular frame 34 is permanently but rotatably located in the opening 33. At the lowest point of the ring frame 36 a handle 37 is fastened to facilitate rotary movement of the circular frame 34. In the ring frame 36 a series of shutters 38 are pivotally mounted. The pivotal axes 38a extend horizontally when the circular frame is so arranged in the opening 33 that the handle 37 is in its normal position, i. e., at the lowest point.

Each shutter 38 has a hand bail 39 in the middle of its lower edge to facilitate pivotal movement of each shutter.

When a car 40 or other vehicle is parked in one of the parking places 12 a window 41 of the vehicle is lowered and the main portion 26 of the housing 25 is inserted into the car. The hook-shaped section 3 supports the housing 25 on the window, which is then moved upwardly until the top of said hook-shaped portion 31 of the housing abuts the upper sill 42 of the window opening. To prevent scratching of the window or otherwise marring it a rubber pad 43 is cemented on or otherwise secured to the wall portions 28, 29 and 30 of the housing 25 forming the hook-shaped portion 31.

After the housing 25 is positioned as described above, the air regulating valve 20 is opened by means of the handle 21 and the shutters 38 are opened to a desired degree. Then air will flow into the vehicle to the extent as desired. The direction of the flow of the air can be adjusted by rotating the circular frame 34 in the opening 33 by means of the handle 37.

To make it possible for occupants of the vehicle to communicate with an attendant, telephone wires 44 are arranged to extend into the housing 25 and to be connected with a call switch 45. In the electric circuit (not shown) a microphone 46 is inserted so that when the switch 45 is closed, conversation between occupants of the car and an attendant in the roadside stand can be had.

An automatic phonograph (not shown) may be located in the roadside stand and the microphone 46 can be so connected therewith as to serve as a loud speaker. The connection between loud speaker 46 and phonograph may be arranged in any well known manner by means of a coin slot 47 in the housing 25. For this purpose a cable 48 of a second electric circuit including the loud speaker 46, the coin slot 47 and a volume regulator 49 may extend into the housing 25.

Having described my invention what I claim and desire to secure by Letters Patent is:

1. An air conditioning apparatus for use with an automobile having a window frame and vertically movable window therein comprising a vertical hollow housing to be positioned upon the inner face of the window and having a lateral hollow extension in communication with said housing at its top which projects outwardly and terminates beyond the outer face of the window, the lateral extension having a recess in its bottom to receive the top of the window, the top of the housing being held against the top of the window frame by raising the window, the inner face of the housing having an opening for the discharge of air therethrough, means in said housing for supporting a loud speaker adjacent said opening, means in said opening for controlling the discharge of air, and a flexible hose connected with the outer end of the lateral extension for introducing conditioned air into the latter.

2. An air conditioning apparatus for use with an automobile having a window frame and vertically movable window therein comprising a vertical hollow housing to be positioned upon the inner face of the window and having a lateral hollow extension in communication with said housing at its top which projects outwardly and terminates beyond the outer face of the window, the lateral extension having a recess in its bottom to receive the top of the window, the top of the housing being held against the top of the window frame by raising the window, the inner face of the housing having an opening for the discharge of air therethrough, means in said housing for supporting a loud speaker adjacent said opening, means in said opening for controlling the discharge of air, a shock absorbing sheet applied to the outer face of the housing next to the window and lining the recess of the lateral extension, and a flexible hose connected with the outer end of the lateral extension for introducing conditioned air into the latter.

THOMAS D. SHARP.

REFERENCES CITED

The following references are of record in the file of this patent:

UNITED STATES PATENTS

| Number | Name | Date |
| --- | --- | --- |
| 940,590 | Gay | Nov. 16, 1909 |
| 984,553 | Gay | Feb. 21, 1911 |
| 1,850,069 | Beatty | Mar. 22, 1932 |
| 1,952,514 | Selby | Mar. 27, 1934 |
| 1,997,408 | Holmes | Apr. 9, 1935 |
| 2,067,575 | Meyerhoefer | Jan. 12, 1937 |
| 2,091,594 | Innes | Aug. 31, 1937 |
| 2,143,966 | Yaeger | Jan. 17, 1939 |
| 2,223,709 | Wickstrom et al. | Dec. 3, 1940 |
| 2,370,359 | McCart | Feb. 27, 1945 |

OTHER REFERENCES

Drive-in Movies, Radio Age, Oct. 1946.